United States Patent
Suman

(10) Patent No.: US 9,534,119 B2
(45) Date of Patent: Jan. 3, 2017

(54) ABRADABLE DRY FILM LUBRICANT AND THE METHOD FOR APPLYING SAME AND ARTICLE MADE THEREFROM

(76) Inventor: Andrew W. Suman, Waterford, MI (US)

( * ) Notice: Subject to any disclaimer, the term of this patent is extended or adjusted under 35 U.S.C. 154(b) by 1026 days.

(21) Appl. No.: 12/443,690

(22) PCT Filed: Oct. 30, 2007

(86) PCT No.: PCT/US2007/083044
§ 371 (c)(1),
(2), (4) Date: Mar. 30, 2009

(87) PCT Pub. No.: WO2008/088600
PCT Pub. Date: Jul. 24, 2008

(65) Prior Publication Data
US 2010/0095837 A1    Apr. 22, 2010

Related U.S. Application Data

(60) Provisional application No. 60/863,533, filed on Oct. 30, 2006.

(51) Int. Cl.
*F16J 1/08*    (2006.01)
*C09D 5/03*    (2006.01)

(52) U.S. Cl.
CPC ........... *C09D 5/033* (2013.01); *F04C 2230/91* (2013.01); *F05B 2220/302* (2013.01);
(Continued)

(58) Field of Classification Search
CPC ............ F04C 2230/91; F04C 2220/302; F05C 2251/2253; F16J 1/00; F16J 1/08; Y10T 428/12028; Y10T 428/12042; Y10T 428/12083; B05D 7/50; B05D 7/532; B05D 7/542; B05D 1/06; B05D 1/36; F05B 2220/40; F05B 2220/302
(Continued)

(56) References Cited

U.S. PATENT DOCUMENTS 5,922,413 A * 7/1999 Takeda ..................... B05D 1/06
427/104
6,688,867 B2 * 2/2004 Suman et al. ................ 418/178
(Continued)

FOREIGN PATENT DOCUMENTS

JP          11099355 A  *  4/1999
WO   WO 2005056276 A1 *  6/2005

*Primary Examiner* — Lee Sanderson
(74) *Attorney, Agent, or Firm* — Paul V. Keller

(57) ABSTRACT

An article with an abradable dry powder coating thereon comprises an abradably coated article with a substrate surface and having at least one coating of a liquid primer on the substrate surface and then coating with at least one abradable dry powder coating on the surface of the liquid primer. The sequence of layers may also be reversed, or additional layers may be useful. The abradable dry powder coating is formed of a dry powder coating composition including a thermoset resin having a cure temperature combined with at least one filler material, wherein the filler is formed of a material which does not melt substantially at or below the cure temperature of the resin, whereby an abradable coating results employing a filler to make the coating. A method of making a composition for coating an article with a coating curable into an abradable coating is also disclosed, comprising melt-mixing an evaporative carrier-free mixture of a dry powder thermoset resin having a cure temperature, to form a mass composite, wherein the filler is formed of a material which does not substantially melt at or below the cure temperature of the resin, cooling the mass
(Continued)

composite, and breaking the cooled mass composite into powder particles, thereby forming the composite powder composition.

15 Claims, 5 Drawing Sheets

(52) U.S. Cl.
CPC ....... *F05B 2220/40* (2013.01); *F05C 2251/14* (2013.01); *F05C 2253/12* (2013.01)

(58) Field of Classification Search
USPC 428/325, 327, 324, 304.4; 524/543; 51/298; 427/208.8, 299–302
See application file for complete search history.

(56) References Cited

U.S. PATENT DOCUMENTS

| 6,844,392 | B2* | 1/2005 | Suman | 524/588 |
| 2004/0012152 | A1* | 1/2004 | Grunke et al. | 277/415 |
| 2007/0071990 | A1* | 3/2007 | Suman | 428/548 |

* cited by examiner

Table 7

| Performance Comparison Criteria | Flow Coatings - Powder Coating | Liquid Industry 2 piston coatings Benchmarked |
|---|---|---|
| Quick break-in depth | 0.0003 - .0013 (tailorable) | N/A |
| Thickness capability | 0.0008-0.0040" | 0.0008" typical max |
| Heated, oiled, sliding durability * | Lasts 1M cycles 586 PSI, 300 °F | Fails @ 58K cycles 330 PSI, 250 °F |
| Heated, oiled sliding durability * after thermal shock cycles 400F to 40F | Lasts TBD 330 PSI, 250 °F | Fails at TBD 330 PSI ? °F |
| Oil retention modes | Huge oil volume at initial run-in, Lasting crevice network Absorption into abraded solid lubricant particles | No crevices Orange-peel and machining grooves only Minimal absorption |
| Oil /grease holding * | Excellent | Fair-poor |
| Oil starved sliding wear rate* | Very low wear | Destructive |
| Piston Clearance Control | Wears in to best fit- Then holds dimension | N/A Too thin for effective clearance control. Wear-in never stops. |
| Process Comparison Criteria | | |
| Environmental | % Negligible VOC's for .003" coating Less oven ventilation | 60 +% Voc's for 0.0008" thick, solvents hazards, Oven ventilation required |
| Application | Automated | Automated |
| Thickness Control | Wide range possible, Control is trickier than liquid | Only narrow range possible in 1 application, Very repeatable |
| Recovery / utilization | Very good | Very good |
| Cure cycle | 350 F 10 min & less | 400F 60 min |
| Overall cycle time | 12-20 min | 50-70 min (drying/curing) |

* In-house sliding wear tester
•

FIG. 5

ABRADABLE DRY FILM LUBRICANT AND THE METHOD FOR APPLYING SAME AND ARTICLE MADE THEREFROM

CROSS REFERENCE TO RELATED APPLICATIONS

This patent application claims the benefit of prior filed U.S. Provisional Patent Application No. 60/863,533 filed Oct. 30, 2006, wherein each of these applications is incorporated herein by reference

BACKGROUND OF THE INVENTION

I. Field of the Invention

The present invention relates generally to abradable coatings, and methods for providing improved adhesion of those coatings, abradable dry film lubricant, with the method for applying and articles made therefrom.

II. Description of the Related Art

The efficiencies of pumps, pistons or compressors rely on the relative movement of internal components against one another to pump liquids or compress gases. For the highest operating efficiency of such devices, it is necessary to minimize leakage between the movable components without having contact between the components. In some devices it is also advantageous to provide a lubricant film to minimize friction between the movable components and/or between the components and the fluid being transferred.

Abradable coatings on the working surfaces of the pumps grind themselves into nearly perfect fitting surfaces when the pump is first operated. Conventional abradable coatings are made of liquid materials which are sprayed or painted onto the working surfaces. Alternatively, the working surfaces can be dipped into the liquid abradable coating composition. The liquid coating may even be electrostatically painted on.

However, these prior art liquid compositions have inherent problems, including adhesion issues, cost for excessive material, environmental concerns arising from the use of the solvents, and the inability to recycle and re-use any overspray, which is surely generated during any spraying or electrostatic applications. Dipping and roller painting may not generate much overspray, but they certainly generate a lot of toxic solvent fumes.

Prior methods are not without their problems, including undesirably high manufacturing costs. For instance, when solvent-based formulations are used, removal, containment, and special handling of the solvent is required. Removal of the solvent (or volatile organic compound) from the coatings—which is completed before the curing process—requires additional heat, time, and handling equipment. The volatile organic compound requires additional care in handling for the safety and health of the operators and the environment. In addition, there is typically significant shutdown time necessary for cleaning and maintenance of solvent-processing equipment. Aside from the problems with processing with solvents, solvent-based materials also create unique problems and additional cost when transporting the materials. There is an additional issue with the thickness of the coating is that they are limited because a thicker coating will sag and run.

Although any water-based system may be more environmentally favorable, there remains additional cost and time of evaporating and handling the water from the coatings and the shutdown time for cleaning and maintenance of the equipment. Furthermore, not all resins can be formulated into water-based systems, so the types of resins available to use with water-based systems are limited.

Another disadvantage of spray coating liquid-based formulations is that it is not practical to recycle any overspray. Reclaimed overspray would require an inordinate amount of re-formulation to adjust its viscosity in order to achieve consistent coating results.

Therefore, there is a need for improved abradable coatings, methods of making and adhering the coatings, methods of coating articles with abradable coatings, and the coated articles themselves. It would be advantageous if the improved coatings were easy to apply, cost effective, energy-wise, used relatively inexpensive and simple equipment, and were environmentally favorable. It would also be advantageous if the composition for forming the abradable coatings was recyclable, to reduce loss during the coating process. Still a further advantage would be realized if the lubricity of the coating could be controlled to best meet different applications.

SUMMARY OF THE INVENTION

The present invention is an abradable dry film lubricant and application process that can reliably deliver an abradable, durable, lubricious, oil retaining, sound damping coating in high volumes and at lower cost than the prior art. This is especially useful for any device having mating moving surfaces needing tight tolerances, and small clearances after break-in. One application of a first aspect of the invention includes pumps, compressors, turbines, and piston assembly components. In this aspect, the properties and thickness of the cured coatings allow reduced clearances without the risks of oil film breakdown, increased friction, higher temperatures, scuffing or seizure.

In the present invention, any components with mating surfaces, having relative motion against each other, such as pumps, turbine blades, pistons, piston rings, lands, and even cylinder bores, can be coated to provide a better fit at their interface. The various common applications for pistons include, but are not limited to, pistons in air compressors, refrigerant compressors, paint sprayers, hydraulic pumps, hydraulic control valves, plumbing valves for gases and liquids, shock absorber pistons, brake pistons, hydraulic cylinder pistons, internal combustion engines, vacuum pump pistons, among others. Other applications include appliances, such as refrigerators, pumps or the like, along with any non-metallic components coated with a conductive primer on the surfaces.

Upon installation and initial operation, or break-in, of the engine, pump, or compressor, the present coating wears away slightly by sliding over each other and the porosity and roughness of the coating allows controlled abrasion of the coating until the contact stresses match the coating material strength. This results in a tight tolerance clearance between the two mating surfaces, so there is less "slop". After complete break-in, which includes full thermal cycling of the unit, the contact stresses are reduced to a level where the coating material has very good durability. The long term running clearance at the surface interface is substantially tighter than is possible using machining alone to minimize the clearance. In addition, the worn surface structure contains pits and fissures which collect oil, and thereby help to maintain an oil film during the reciprocating motion of the piston.

The abradable dry film lubricants in the present invention use compositional and structural mechanisms to achieve quick break-in and long-term durability, especially in oiled applications. The roughness and porosity of the coating surface provides an easy run-in at high stress areas. Porosity content is selected for achieving a desired coating structure and performance, as the oil of the engine is caught in, and rides in, the ligament walls of the pores that are not abraded away. The oil "stored" in the pores of the porous coating actually provides a ready supply of lubricant oil film at the piston-bore surface. Once the interference fit is worn away, the contact stress drops and allows long term durability with an improved fit and lubricity due to the remaining crevices and fissures in the pores hold oil and help maintain a hydrodynamic film. If persistent oil starvation occurs, the material may wear, releasing solid lubricant into the interface. These lubrication mechanisms enable designs to benefit from tighter clearances while preventing scuffing and other destructive modes.

One aspect of the present invention discloses an abradable dry film lubricant that includes a liquid primer and a primary powder coating. The liquid primer and the primary powder coating can be achieved with formulations comprising up to 45 volume percent performance enhancing additives. The resin binder system makes up the remaining 55 or more volume percent of the solid portion of the coating. For the powder coating, suitable additives will not substantially melt at or below the cure temperature of the resin binder system.

The resin system of abradable dry film lubricant can include other additional materials, which add lubricity to the coating, and/or affect the final structure of the cured coating. Some categories of these desirable additional materials may be classified as lubricants, waxes, film-formers, plasticizers and foaming agents. These materials can be used individually or in combination to create a wide variety of effects.

In accordance with the present invention, an abradable dry film lubricant composition includes a primary powder coating formed of uncured thermoset resin with at least 5 volume percent additives. The additives are selected so that they do not substantially dissolve in a solvent or melt at or below the cure temperature of the thermoset resin. First, a liquid primer may be applied to a surface prior to subsequent powder coating in order to aid in the adhesion of the primary powder coat material. In the liquid primer, resins and additives are blended into a solvent to form a slurry, which is sprayable, brushable, pad printable, silk screenable, or any other conventional method of coating. In the primary powder coating, additives are dispersed throughout the resin, where the additive particles become exposed when the pore ligaments wear down after break-in. When both contacting surfaces have the abradable coating thereon, and the pump is started, these abradable surfaces scrape against one another and form a fairly smooth, but sometimes porous, surface is which does not allow leakage therepast.

When one of two mating surfaces has the abradable coating thereon, such as a pump, turbine or piston in an internal combustion engine, the coating on the surface, like the piston, will wear to fit during initial cycling. The presence of the coating provides benefits in engine power through efficiency and piston/bore durability through reduced scuffing potential, among other benefits. An abradable powder coating could also be applied to the ring lands and/or the piston rings to help seal the ring to the piston and allow free motion of the piston ring in the ring groove so that good contact is maintained between ring and bore. Coating the ring outer diameter could also help with engine or compressor break-in and performance.

Another aspect of the present invention includes a method for making the abradable dry film lubricant composition of the present invention which includes melt-mixing the polymeric components, such as the thermoset resin, with at least 5 volume percent of filler, cooling the resulting mass composite, and then breaking the cooled mass composite into tiny powder particles for later use as the powder of the powder coating. This method produces a homogeneous powder particle composition suitable for use with the present invention.

Yet another aspect of the present invention is the practice of a method for coating any suitable substrate, but especially a piston assembly component, such as a piston, piston ring, land or cylinder bore, either totally or intermittently, with an abradable coating made in accordance with the present invention by applying the dry composite filler-containing powder coating composition onto the piston assembly component and curing the dry powder composition. Electrostatic coating is the preferred application method. Although any suitable method for applying dry powder coating composition to a substrate may be utilized, the least waste is experienced when utilizing the electrostatic dry powder coating method. The present invention also includes a process and tooling for washing, masking, and coating piston assembly components, either in their entirety or on portions only, such as pistons, piston rings, and lands, which virtually eliminates waste during application and allows cost effective automation of high quality electrostatic coating processes.

Other advantages of the present invention will be readily appreciated as the same becomes better understood after reading the subsequent description taken in conjunction with the appendant drawings. Although the invention will be described by way of examples hereinbelow for specific embodiments having certain features, it must also be realized that minor modifications that do not require undo experimentation on the part of the practitioner are covered within the scope and breadth of this invention. Additional advantages and other novel features of the present invention will be set forth in the description that follows and in particular will be apparent to those skilled in the art upon examination or may be learned within the practice of the invention.

Therefore, the invention is capable of many other different embodiments and its details are capable of modifications of various aspects which will be obvious to those of ordinary skill in the art all without departing from the spirit of the present invention. Accordingly, the rest of the description will be regarded as illustrative rather than restrictive.

BRIEF DESCRIPTION OF THE DRAWINGS

FIG. 5 presents a table comparing an abradable dry film lubricant of the present invention with two coatings made from liquid compositions that have been used in the industry.

FIG. 6 shows a stroke v. concentrate diagram of the performance of a powder blend of base coat and top coat without a primer, which illustrates the gelation time, MEK rub and trolly cycles of the different concentrates under different strokes for the dry powder portion of the coating.

FIG. 7 shows a stroke v. concentrate diagram of another example without primer, which illustrates the gelation time, MEK rub and trolly cycles of the different concentrate under different strokes.

DETAILED DESCRIPTION OF THE INVENTION

Figure 1:
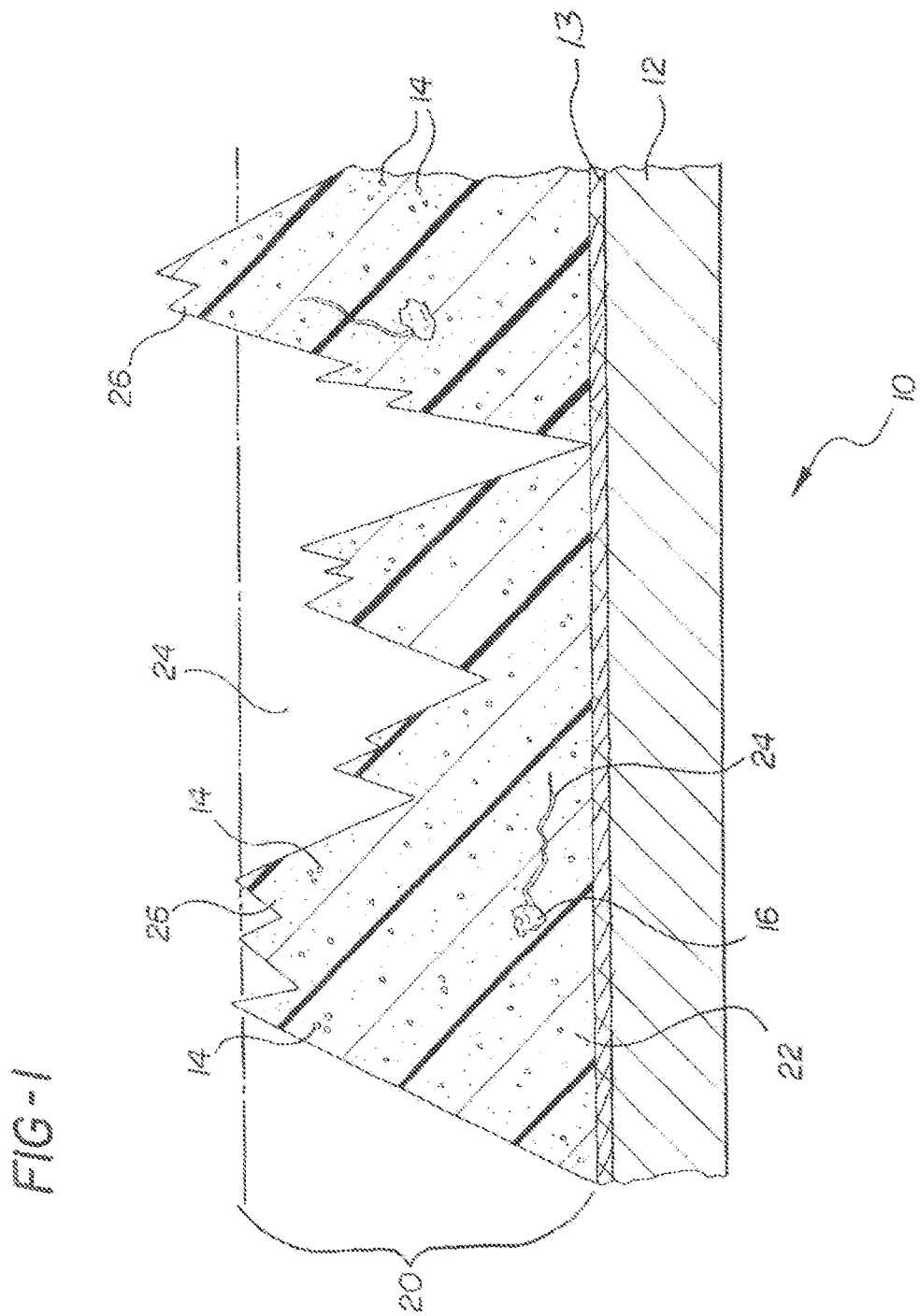
FIG. 1 is a cross-sectional view of a liquid primer coated and dry powder coated component according to the present invention.

The present invention generally discloses an abradable dry film lubricant, methods for making and articles coated with the abradable dry film lubricant. As described below, adhering an abradable dry film lubricant to a surface may include the application of at least two coatings. The present abradable dry film lubricant is especially useful for adhering a coating onto a component or components on a surface of a device in which the components move tightly relative to each other with a minimum clearance between the components. Desirable components, such as pumps, turbines, pistons or piston rings in an internal combustion engine or a compressor will find true utility. The abradable dry film lubricant may also be formulated to provide self-lubrication. To achieve the minimum clearance and optionally, lubricity, the component(s) is coated with the abradable dry film lubricant, which is subsequently cured. The abradable dry film lubricant is applied to a thickness such that the movable components may contact each other during initial operation of the device. Then, during initial use of the device, the abradable dry film lubricant is worn down until an essentially zero clearance during operation is achieved. After initial break-in, the abradable dry film lubricant remains in place to reduce clearances, prevent incidental contact between the surfaces, and maintain lubricity between the surfaces.

I. The Composition of Abradable Dry Film Lubricant and Method of Making

The abradable dry film lubricant of the present invention generally includes at least two layers of coatings. The first layer is a liquid primer and the second layer is a primary dry powder coat. The liquid primer ensures better adhesion of the primary dry powder coating to the surface, increases the primary powder coating durability, and provides additional protection for the material being coated. The primary dry powder coating is cured and is then generally abradable, durable, lubricious, oil retaining, and sound damping when applied on a component.

The Liquid Primer

In its simplest form, the primer composition is a liquid coating which contains uncured thermoset resin, along with certain additives and solvent, if so desired. This uncured thermoset resin may be a resin system, which includes resin polymer and a hardener, if hardener is needed for that particular resin. The hardener or any other curing initiator functions to induce crosslinking of the resin polymer within a specific temperature range to is provide strength and chemical and thermal resistance to the polymer matrix in the resultant coating. The type of thermoset resin employed is not limited.

For example, the thermoset resin type may be acrylic, polyester, epoxy, allyl, melamine formaldehyde, phenolic, polybutadiene, polycarbonate, polydicyclopentadiene, polyamide, polyamide imide, polyurethane, silicone, or any combination of these resin types. Examples of useful resin systems include epoxy, high temperature epoxy, polyamide, polyamide imide, silicone, polyaryl sulphone, polyester, polyphenylene sulphide, other resins, and any combination of these which maintain some mechanical properties at the operating temperature of the pump components, turbine blades, pistons, piston engine, piston driven pump, or compressor, or whatever application the present invention is employed into. Useful resins include epoxy cresol novalac and polyamide imide. The content of resins may range upward from 35 percent of the composition by volume.

Some resin systems require or benefit from the addition of a hardener, a crosslinker, or a catalyst. These materials promote curing reactions for thermoset resins, and often improve strength, thermal resistance, chemical resistance, and adhesion of powder coatings. Examples include dicyandiamides, phenolic hardeners, solid amine adducts, amines, aromatic amines, creosol novolac hardeners, imidazole hardeners, and others. They can be added to abradable powder coatings in amounts ranging from 0 to 25 percent by weight of the resin system.

A useful catalyst of the present invention is (modified) amine. The list of the (modified) amines includes, but is not limited to, alkanolamines, morpholines, piperazines, substituted propylamines, JEFFCAT® tertiary amines, ethyleneamines and JEFFAMINE® polyoxyalkyleneamines.

Table 1 below shows a detailed list of the various amines. The most preferred hardener includes solid epoxy amine adducts, available from chemical suppliers, such as Huntsman International, LLC of Salt Lake City, to Utah.

TABLE 1

| Amine |
|---|
| Alkanolamines |
| Monoethanolamine (MEA)
Diethanolamine (DEA)
Triethanolamine (TEA)
Dimethylethanolamine (DMEA)
N-methyldiethanolamine (MDEA)
Monomethylethanolamine (MMEA)
DIGLYCOLAMINE ® Agent/DGA ® brand
2-(2-aminoethoxy)ethanol
Aminoethylethanolamine (AEEA) |
| Morpholines |
| Morpholine (MOR)
N-methylmorpholine (NMM)
N-ethylmorpholine (NEM)
N-methylmorpholine oxide, aqueous
solution (NMMO) |
| Piperazines |
| N-aminoethylpiperazine (AEP)
Dimethylpiperazine (DMP)
JEFFCAT ® dimethylpiperazine |
| Substituted Propylamines |
| Dimethylaminopropylamine (DMAPA)
Methoxypropylamine (MPA)
Aminopropylmorpholine (APM)
Aminoproplymonomethylethanolamine
(APMMEA) XTA-758 |

TABLE 1-continued

Amine

JEFFCAT ® Tertiary Amines

N,N-Dimethylcyclohexylamine (DMCHA)
Pentamethyldiethylenetriamine (PMDETA)
Tetramethyl bis(aminoethyl)ether (ZF-20)
DMDGA ™ N,N-dimethyl-2-(2-aminoethoxy)
ethanol (ZR-70)
Tetramethyldipropylenetriamine (Z-130)
Pentamethyldipropylenetriamine (ZR-40)
Benzyldimethylamine (BDMA)
Ethyleneamines Ethylenediamine (EDA)
Diethylenetriamine (DETA)
Triethylenetetramine (TETA)
Tetraethylenepentamine (TEPA)
JEFFAMINE ® Polyoxyalkyleneamines XTJ-505 (M-600)
XTJ-506 (M-1000)
XTJ-507 (M-2005)
M-2070
D-230
D-400
D-2000
XTJ-510 (D-4000)
XTJ-500 (ED-600)
XTJ-501 (ED-900)
XTJ-502 (ED-2003)
XTJ-504 (EDR-148)
HK-511
T-403
XTJ-509 (T-3000)
T-5000
XTJ-435 chemical intermediate
XTJ-436
Aradur 3261-1
Aradur 9664-1

Additives may be used to reduce friction and wear, increase viscosity, improved viscosity index, resist corrosion and oxidation, aging or contamination. The level and type of additive will be selected to effective deliver the reduced friction and wear, increased viscosity, improved viscosity index, resistance to corrosion and oxidation, aging or contamination.

The additives may be selected from a variety of materials, including, but not limited to, metals, minerals, mineral substances, ceramics, polymers (including fluoro-polymers), silicon dioxide, titanium dioxide, gypsum, silicate minerals (such as talc and aluminosilicates), graphite, diamond, molybdenum disulfide, fluorides such as calcium fluoride, magnesium fluoride and barium fluoride, clays, dirt, wood, ash, pigments, magnetic materials, phosphorescent materials, cured resin systems, cured composite powder compositions made according to the present invention, and mixtures thereof.

Examples of clays which are suitable for the present invention include kaolin, mullite, montmorillonite, and bentonite. Examples of ceramics which are suitable for the present invention include boron nitride, boron carbide, mullite, tungsten carbide, silicon nitride and titanium carbide. Many additives are available from Atlantic Equipment Engineers, a Division of Micron Metals, Inc., Bergenfield, N.J. Other suitable minerals may be selected from those having a MOH's hardness of between about 0 and 10, which includes minerals having MOH hardnesses from carnotite (with a hardness of 0) up to diamond (with a hardness of 10). Such an entire list of minerals are those available from Atlantic Equipment Engineers, described above, or any other supplier of minerals and mineral substances. Combinations of any of the above-listed fillers may also find advantages.

Examples of preferred additives in the primer include solid lubricants such as graphite, PTFE, polyamide, polyamide imide, polyimide, boron nitride, carbon monofluoride, molybdenum disulphide, talc, mica, kaolin, the sulfides, selenides, and tellurides of molybdenum, tungsten, and titanium or any combination thereof. Other additives may be added for corrosion resistance such as sacrificial metals. Preferred sacrificial metals are metals whose oxides are lubricious.

For some applications, a blend of additives, such as a blend of graphite and clay, is preferred. Especially suitable additive compositions include from about 20 to about 40 volume percent clay and from about 60 to about 80 volume percent graphite based on the resulting additives content. Other combinations may also be desirable. The graphite may be in the form of fibers pulverized to a size of from about 7 to about 30 micrometers in length, although it is believed that the preferred mean size is about 20 micrometers.

Additives such as graphite, fluorides, talc, boron nitride, and molybdenum disulfide possess lubricating properties and, therefore, when used, provide lubrication properties to the coatings.

The liquid primer material of the present invention may also contain polymers or polymer waxes. The addition of polymer waxes renders the final product softer, more easily abradable, and, therefore, less additives may be needed. Suitable polymers may include any thermoset resin or thermoplastic such as polyethylene, polypropylene, fluoropolymers, co-polymers and any combination thereof. Any monomer that will not react with the hardener may be is suitable to add softness, yielding a more abradable coating, so long as it will not crosslink and become hard. Polymer waxes may also improve the performance of the composite powder during application. Various polymer waxes may be used, e.g., fluoropolymer wax, polyethylene wax and polypropylene wax.

In addition, lubricants may be included, such as hydrocarbons and polymers like polyethylene, polypropylene, nylons, polymer waxes, oils, and others listed in the 1999 Modern Plastics Encyclopedia and Buyers Guide, McGraw-Hill Co., 2 Penn Plaza, New York, N.Y. Other lubricants include metallic stearates, fatty acids, fatty alcohols, fatty acid esters, fatty amides and others listed in said 1999 Modern Plastics Encyclopedia and Buyers Guide.

The solvent is a solution that breaks down the essential properties of the resins and additives. The suitable solvents usually have a low boiling point and evaporate easily or can be removed by distillation, thereby leaving the dissolved substance behind. Organic solvent is preferred over non-organic solvent. The term organic solvent refers to most other solvents that are organic compounds and contain carbon atoms. There are many different kinds of solvents, each performing a specific reaction (function) with a specific product. The solvents may include, but are not limited to, methyl ethyl ketone (MEK), N-Methyl-2-pyrrolidone (NMP), turpentine, xylene, mineral spirits, turpenoid, lacquer thinner, denatured alcohol, kerosene, gasoline, acetone and combination thereof. A useful solvent of the present invention is MEK and lacquer thinner mix, or NMP. The solvent is added at levels of about 1 to 95 volume percent based on the volume of the resultant primer, depending on the application method of the primer.

The primer of the present invention has a fast cure time and good sliding wear performance. The primer can be cured as fast as 0.5 min at 400° F. The sliding wear performance can be achieved at cures of 15 min at 330° F.

The primer can be made by mixing or grinding the resins, hardeners (if required), additives and solvents in any suitable equipment such to as a ball mill, or a high intensity mixer.

Although the above-described method of making the liquid primer is one method, the primer may also be made by any other suitable method, including wet milling the raw materials together. In this method, attrition mills or ball mills, etc., may be used. In the case of wet milling, the liquid solvent would is be added into the composite powder composition during the process.

Examples

Table 2 shows two examples of the primer, which were prepared from the following formulations. All weights are given in kilograms.

TABLE 2

| Ingredient | Ex. 1 | Ex. 2 |
|---|---|---|
| ECN bis A epoxy (ECN1299) | 0.87 | 0 |
| Type 3 epoxy (7013) | 4.7 | 0 |
| Type 3.5 epoxy masterbatch(7226) | 1.01 | 0 |
| EPN modified type 7 epoxy (7220) | 2.56 | 0 |
| polyamide-imide | 0 | 5.11 |
| kaolin | 0.87 | 0.44 |
| graphite | 2.59 | 1.45 |
| solid epoxy amine adduct | 73.04 | 0 |
| NMP | 0 | 43 |
| MEK | 30 | 0 |
| lacquer thinner | 7.5 | 0 |

The Primary Dry Powder Coat

The primary coat is a dry powder which contains uncured thermoset resin and filler. The term "dry" is used to mean without evaporative carriers, such as volatile organic compounds (VOCs) or water as carriers for the powders, especially useful for powder coat applications. The composition and method of making the primary coat was disclosed in the U.S. patent application Ser. No. 10/596,162, titled "ABRADABLE DRY POWDER COATINGS ON PISTON ASSEMBLY COMPONENTS," entered the US national phase on Jun. 1, 2006, and it is incorporated herein in its entirety.

Fluidizing agents, such as fumed amorphous silica or aluminum oxide, may be added to the mixture to improve fluidization during application, reduce clogging in electrostatic spray equipment, and reduce clumping during storage. Additional solid powders can be blended in with the composite powder before or during the steps of fluidizing or mixing.

When applying to the article, more than one layer of the primary coat may be employed. In addition, the different layers of the primary coats may have different compositions, such as a soft uppermost layer that abrades more easily, with a hard lowermost layer for greater abrasion. Or, the various compositions may be combined with each other in any of the layers. These primary coats include a powder base coat and a powder top coat. Table 3 is shows examples of the powder base coat and the powder top coat, which were prepared from the following formulations. All weights are given in kilograms.

TABLE 3

| Ingredient | Powder Base Coat | Powder Top Coat |
|---|---|---|
| ECN bis A epoxy (ECN1299) | 116.32 | 0 |
| Type 3 epoxy (7013) | 626.32 | 0 |
| Type 3.5 epoxy masterbatch (7226) | 134.21 | 0 |
| EPN modified type 7 epoxy (7220) | 340.00 | 0 |
| silicone resin | 0 | 1320 |
| kaolin | 125.26 | 160 |
| graphite | 375.79 | 520 |
| solid epoxy amine adduct | 63.28 | 0 |
| pp | 71.58 | 0 |

The powder base coat and the powder top coat may be interchangeable, or mixed into one composite powder composition, including silicone resin and solid epoxy amine adduct. The base and top coat, or the mixed dry powder may be preferred because it provides a short cure cycle time of about less than 10 minutes. Combinations of these materials are also envisioned.

Figure 4:
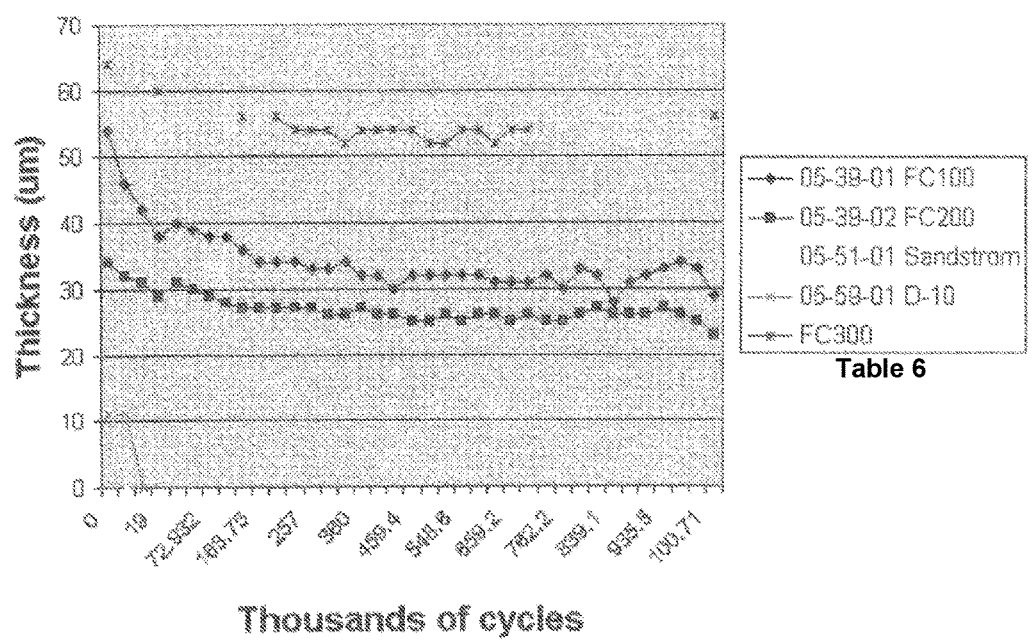
FIG. 4 is a coating thicknes v. cycles diagram illustrating the differences in wear rate among coatings differing of various compositions.
Figure 6:
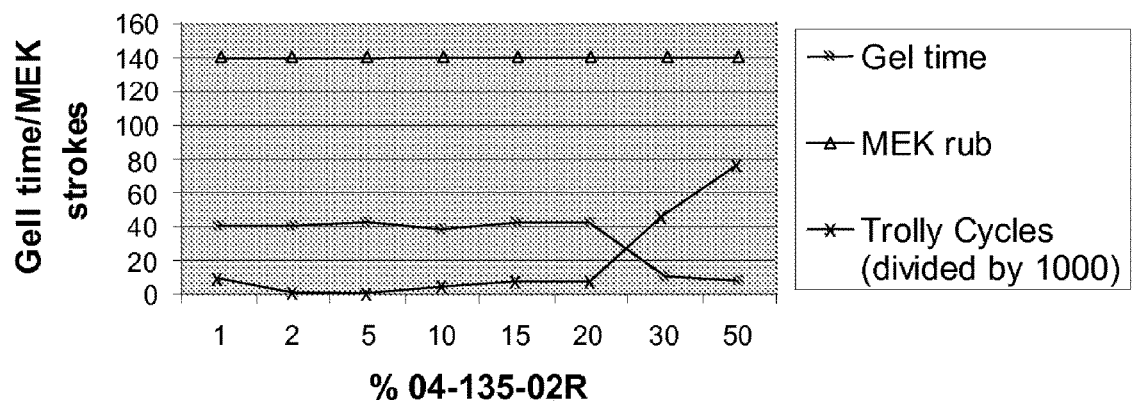
FIG. 6 is a stroke v. concentrate diagram of the performance of a powder blend of base coat and top coat without a primer.
Figure 7:
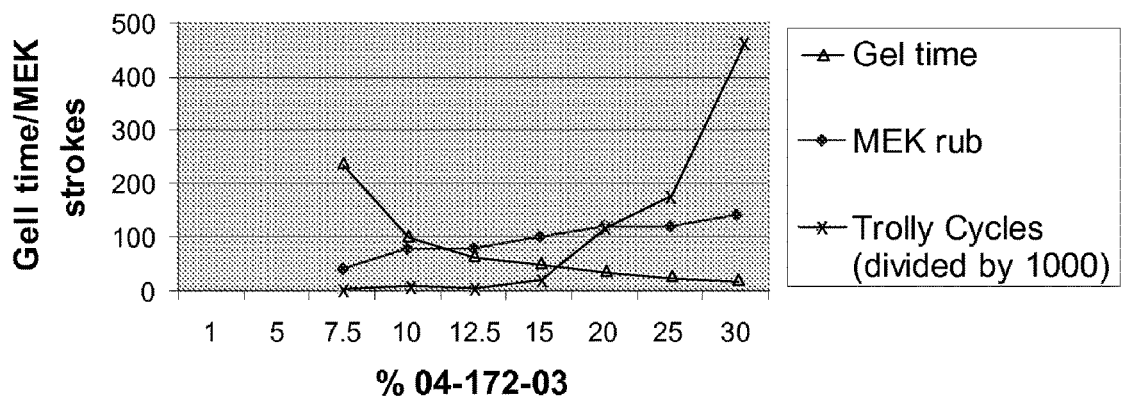
FIG. 7 is a stroke v. concentrate diagram of another example without primer.

FIG. 4 shows a stroke v. concentrate diagram of the performance of a powder blend of base coat and top coat without a primer, which illustrates the gelation time, MEK rub and trolly cycles of the different concentrates under different strokes for the dry powder portion of the coating.

The gelation time is the interval of time, in connection with the use of synthetic thermosetting resins, extending from the introduction of a catalyst into a liquid adhesive system until the interval of gel formation. Here, the gelation time happened at 40 seconds between 1% to about 28%. When the concentration exceeded about 28%, the gelation time decreased sharply to about 8 to about 10 seconds.

The solvent rub test here is performed using methyl ethyl ketone (MEK) as the solvent. Its primary utility is to determine the extent to which a coating is cured. This test involves rubbing the surface of a baked film with cheesecloth soaked with MEK until failure or breakthrough of the film occurs. The results of this type of test provide a measure of the chemical resistance for the coating. When the results are compared to those of a control, known to be fully cured, a good qualitative determination of the degree of cure can be made. Here, the MEK rub test shows the coating was penetrated at about 140 strokes, which is consistent with various concentrations of Example 1.

FIG. 5 shows a stroke v. concentrate diagram of another example without primer, which illustrates the gelation time, MEK rub and trolly cycles of the different concentrate under different strokes.

The gelation time decreased when the concentration increased, while the MEK rub test results better at higher concentration than lower.

Regarding coating methods, different modes of application may be used, e.g., electrostatic spraying or electrostatic fluidized bed coating.

An optional pre-treatment of using a sealer, grit blasting, or shot peening is possible for improving the surface treatment. Another optional step of phosphate washing may be performed thereafter. Other known pre-treatments may be useful for adhesion of the textured coating, such as a polymeric adhesive treatment. Plastic media blasting may also prove useful.

II. Articles of Coating

The industrial applicability of the present invention includes the coating of components in pumps, compressors, piston engines, medical devices, appliances, turbine blades, non-metal components and in any device which has moving parts. Parts such as pistons, piston rings and piston bores may be typical substrates.

There may be at least nine different combinations of coatings with the liquid primer, the base coat and the top coat. The nine different possible coatings may include liquid primer only, one liquid primer and one mixed powder coat, one liquid primer with only one base coat, one liquid primer with only one base coat, one base coat only, one top coat only or one mixed coat only, or one liquid primer with one base coat and one top coat. The coating of the present invention is not limited to only one or two layers of coatings. Various to compositions of coatings may be layered or mixed, as desired. The abradable dry film lubricant of the present invention may include a two-layer coating or any multi-layer coating. Further, more liquid primer can be applied over the dry powder coat material layer to some advantage. This allows a change in the sintering step to provide non-sagging application with further benefits. The liquid/powder/liquid sequence can be applied in multiple layers of any combination to achieve desired thicknesses and properties.

Other surface preparations and sealers may also be applied to the surface prior to coating with the liquid primer or the dry composite powder composition. Grit blasting, anodizing and other preparation steps may also be desirable prior to coating the substrates. In addition, other various adhesion methods can be applied, which may include thermal spraying, anodizing, sulfonation, etching, metal deposition, plasma vapor deposition, plasma, phosphate conversion coatings, chrome based conversion coatings, nonionic treatments, anionic treatments, cationic treatments, amphoteric treatments, polymeric treatments, sealers, sol-gels, and plating.

Looking first to FIG. 1, a simplified depiction of a typical coated article of the present invention is shown in FIG. 1 and generally denoted by the numeral 10. FIG. 1 shows a cross-sectional view of a portion of a generalized outer surface piston assembly component substrate 12 coated with a first liquid primer coating 13 having a cured composite powder composition 20 of the present invention thereon. Cured composite powder composition 20 includes filler 22 and resin 24. Microcrystallites of nearly dissolved additives 14 occur in the powder composition coating 20. Fissures 16 stop any degradation and cracking of coating 20. Coating 20 typically has the appearance of mountain tops 26, spreading at the surface of the substrate 12, yet maintaining some of the sprayed-on appearance due to the sintering of the coated material without much flow.

Figure 2:
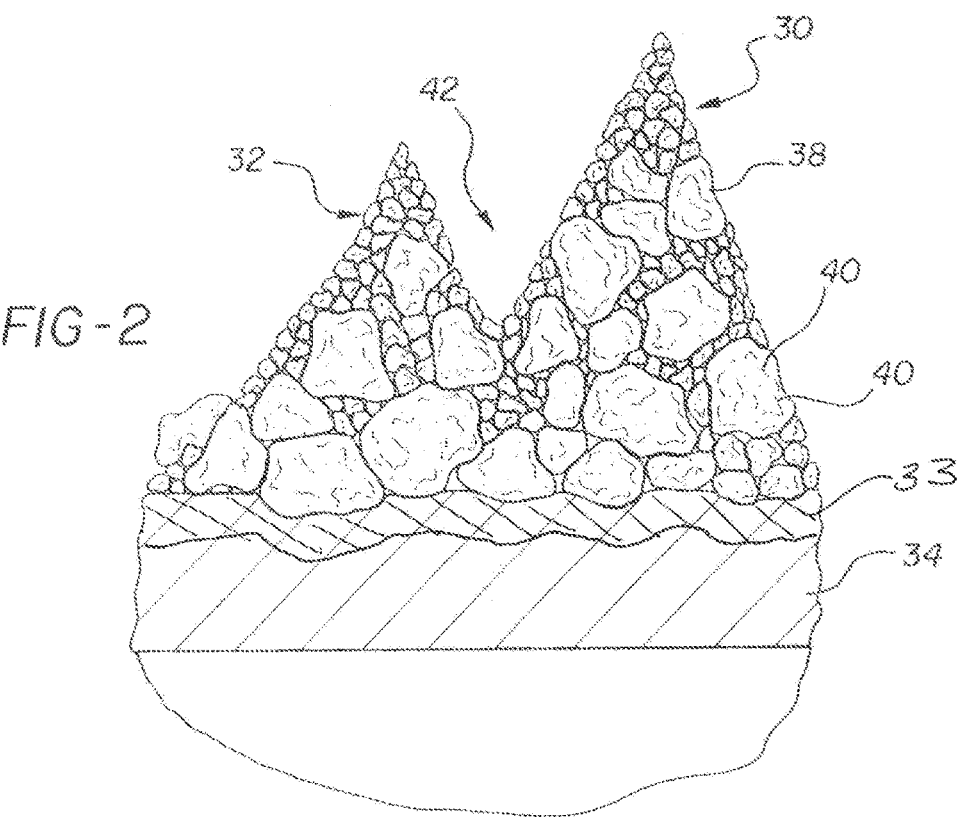
FIG. 2 is a detailed microscopic view of a fresh coating of the abradable coating, showing the peaks and valleys.
Figure 3:
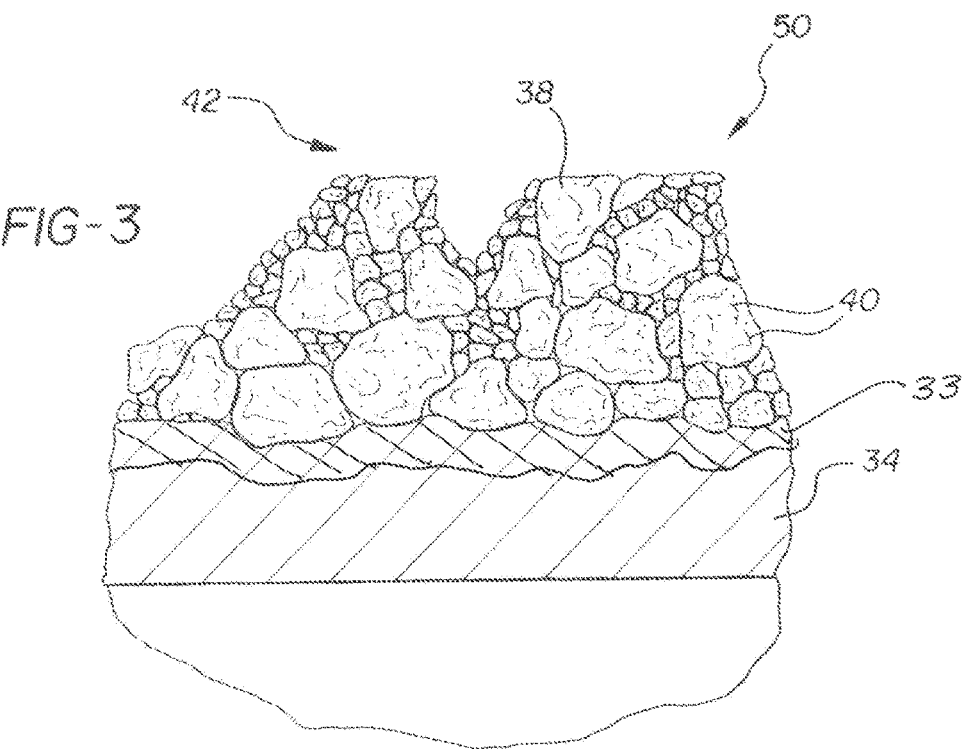
FIG. 3 is a detailed microscopic view of the same abradable coating after it has run against another surface with the abradable coating, showing the reduced coating height. stroke v. concentrate diagram of the performance of a powder blend of base coat and top coat without a primer.

Looking next to FIG. 2, there is shown a detail of one of the peaks, or asperities, 26 as illustrated in FIG. 1, where the peaked structure coating is generally denoted by numerals 30 and 32, and being made of individual powder granules 38 held together by the resin component at the points where they touch. Each powder particle is a homogeneous composition of the thermoset resin and filler. Filler 40 is shown as lines throughout the bulk of the individual powder granules themselves. Resin is shown having the filler therein, and the entire component rests on substrate 34. A first coating of liquid primer coating 33 is applied directly to substrate 34, with or without prior substrate conditioning procedures. Valley 42 is shown between the peaks FIG. 3 illustrates the coating of FIG. 2 after break-in, where the peaks 30 and 32 of FIG. 2 have been abraded away, showing the flattened tops generally denoted by the numeral 50 with decreased valley depths 42. The valleys act to catch oil and provide lubricants during oil starvation situations. Individual powder granules 38 are exposed along with filler particles 40, although the shear off of the peaks expose the upper surface of particle 38. Again, liquid primer coating 33 is directly applied over the substrate 34, although an optional second layer of liquid primer coating may be applied over the flattened peaks 50. This greatly reduces scuff resistance.

The abradable dry film lubricant of these aspects of the present invention includes various advantages. Structurally, the break-in event of the abradable dry film lubricant involves the relatively easy wear of the uppermost asperities in the coating structure. Those asperities may be formed by the sintered topography of the homogeneous particles or by the ligament walls of the foamed up resin if a foaming agent is used. The fracture and wear of the asperities releases solid lubricant particles into the stressed area, protecting the mating surfaces from scuffing. This scuffing protection mechanism is effective regardless of the alloy or composite compositions, and is especially important during initial start-ups, cold starts, and oil starvation events. In the case of exposed ligament walls, oil is caught within the individual pore cells, ready to provide further lubrication. As the coating continues to wear, the asperities are worn down to their thicker bases, which have more cross-sectional area, and greater load carrying capability. The break-in is complete when the contact stresses no longer exceed the strength of the abradable dry film lubricant structure. After break-in, the oil retaining properties and strength of the coating maintain the tight clearance at the interface, and lubricious properties decrease friction between the mating surfaces of the moving parts.

In FIG. 4 Table 6 shows a coating thickness v. cycles diagram illustrating the varying thickness of different composition of abradable dry film lubricants after thousands of cycles.

The lubricants were coated on aluminum panels, which was operated at 300° F. under 586 PSI (4.40 Mpa) with 60 mm stroke at 90 cycle/min. Upper curve shown indicate the abradable dry film lubricants of the present invention keep relatively the same thickness after the initial break-in, which happened after 45,000 cycles. The thickness provides oil retaining properties and strength of the coating. On the other hand, the regular lubricants, shown by the lowest curve have no thickness after the initial break-in, which happened around 19,000 cycles.

The roughness, porosity, and cohesive material strength of to abradable dry film lubricants can be manipulated through formulation, manufacture, and cure conditions to provide a robust balance of clearance control, durability, oil film maintenance, and scuff protection on components. These characteristics are particularly advantageous in high volume engine building, where piston-to-bore clearances are governed by machining tolerances.

In FIG. 5 Table 7 compares the abradable dry film lubricant of the present invention with two other industry liquid coatings, one being Series E722 Piston Skirt Coating®, commercially available from Sandstrom Products Company of Port Byron, Ill., and the second one is D10, commercially available from Dow Chemical Company, Midland, Mich.

The comparison table shows many advantages of the present invention. Therefore, it is shown that a preliminary primer coating aids in the adhesion of a subsequent powder coat layer. The primer coating and powder coat combination effect adhesion and durability in a superior fashion.

An article can be made with an abradable dry powder coating to thereon, where an abradably coated article includes a substrate surface having at least one coating of a liquid primer on the substrate surface and an abradable dry powder coating on the surface of the liquid primer, or vice versa. Additional layers of each of these two layers may be transposed or added, depending on the application. The abradable dry powder coating is formed of a dry powder coating composition including a thermoset resin having a cure temperature combined with at least one filler material, wherein the filler is formed of a material which does not melt substantially at or below the cure temperature of the resin. The powder coating may have a structure where the coating has from about 20 to about 90% mass of its geometrically theoretically calculated mass. The abradable coating results employing a filler which makes the coating abradable.

The thermoset resin may be selected from the group consisting of acrylic, polyester, epoxy, allyl, melamine formaldehyde, phenolic, polybutadiene, polycarbonate, polydicyclopentadiene, polyamide, polyamide imide, polyurethane, silicone, and combinations thereof. The coating of the dry powder composition may be employed non-continuously across the surface of the to substrate.

The filler is employed in an amount to provide abrasion qualities, like an amount of from about 15 to about 30 volume percent based on the volume of the resultant composite powder composition. The filler may be selected from the group consisting of metals, silicates, graphite, boron nitride, diamond, molybdenum disulfide, fluorides, clays, dirt, wood, ash, pigments, ceramics, polymers, silicon dioxide, titanium dioxide, gypsum, phosphorescent materials, cured resin systems, cured composite powder compositions, and mixtures thereof.

The dry composite powder composition may further contain a polymeric material selected from the group consisting of polymers, non-activated thermoset resin, thermoplastics and polymer waxes. The powder composition may contain a polymer wax selected from the group consisting of fluoropolymer wax, polyethylene wax and polypropylene wax, or a foaming agent that is gas-producing when heated, such that the coating includes gas voids with ligament walls after curing.

This results in an abradable coating having a roughness Ra value of from about 1 to about 2000 microinches, and an Rsk value of from about 10 down to about −150, if coated to a thickness of from about 5 to about 250 micrometers thick, and especially if the abradable coating is coated to a thickness of from about 15 to about 80 micrometers thick.

A method of making a composition for coating an article with a coating curable into an abradable coating comprises melt-mixing an evaporative carrier-free mixture of a dry powder thermoset resin having a cure temperature, to form a mass composite, wherein the filler is formed of a material which does not substantially melt at or below the cure temperature of the resin, cooling the mass composite and then breaking the cooled mass composite into powder particles, thereby forming the composite powder composition that is to be applied to the substrate. This method may further comprise consolidating the resin and the filler together into small units before the melt-mixing. Then, the resin and the filler are consolidated together into small units and mixed a hardener with the small units before the melt-mixing step. In this method, the resin may be selected from the group consisting of acrylic, polyester, epoxy, allyl, melamine formaldehyde, phenolic, polybutadiene, polycarbonate, polydicyclopentadiene, polyamide, polyamide imide, polyurethane, silicone, and combinations thereof.

The above examples are illustrative only and should not be construed as limiting the invention which is properly delineated in the appended claims.

The foregoing description of a preferred embodiment of the invention has been presented for purposes of illustration and description. It is not intended to be to be exhaustive or to limit the invention to the precise form disclosed. Obvious modifications or variations are possible in light of the above teachings with regards to the specific embodiments. The embodiment was chosen and described in order to best illustrate the principles of the invention and its practical applications to thereby enable one of ordinary skill in the art to best utilize the invention in various embodiments and with various modifications as are suited to the particular use contemplated. It is intended that the scope of the invention be defined by the claims which are appended hereto.

INDUSTRIAL APPLICABILITY

This invention finds applicability on any two contacting work surfaces, but is especially applicable to coating the contacting surfaces on any components with mating surfaces, including pumps, turbines, pistons and piston components, rotors and gas compressor components. Turbochargers find particular utility.

What is claimed is:

1. An article with an abradable dry powder coating disposed thereon that is the product of a process, comprising:
    applying a liquid primer to a surface of the article, wherein the liquid primer comprises a first thermosetting resin and a solvent; and
    applying a dry powder coating over the liquid primer, wherein the dry powder coating comprises particles comprising a second thermosetting resin and a filler material, where the filler material does not melt at or below a cure temperature of the second thermosetting resin; and
    curing the liquid primer and the dry powder coating to form a dry powder film lubricant wherein the dry powder film lubricant comprises a polymer matrix formed from the first thermosetting resin in a layer proximate the surface of the article and a porous layer formed from the particles of the dry powder coating adhered to one-another in a layer distal to the surface of the article;
    wherein curing causes the dry powder particles to sinter, but curing completes without the particles of the dry powder coating flowing sufficiently to lose their discrete identities; and
    wherein the porous layer formed from the particles of the dry powder coating adhere to one another in a layer distal from the surface of the article is thicker than the polymer matrix formed from the first thermosetting resin in a layer proximate to the surface of the article.

2. The coated article according to claim 1, wherein the filler is of a type and is employed in an amount that make it effective to provide abrasion qualities.

3. The coated article according to claim 1, wherein the filler is employed in an amount from about 15 to about 30 volume percent based on the volume of the dry powder coating.

4. The coated article according to claim 1, wherein the dry powder coating further comprises a polymer wax selected from the group consisting of fluoropolymer wax, polyethylene wax and polypropylene wax.

5. The article of claim 1, wherein the porous layer has 10%-80% porosity.

6. The article of claim 1, wherein the liquid primer is a slurry.

7. The article of claim 1, wherein the article is a piston.

8. The article of claim 1, wherein the dry powder coating is the product of a process that comprises:
melt-mixing the second thermosetting resin and the filler material to form a composite;
cooling the composite; and
breaking up the cooled composite to form the dry powder.

9. The article of claim 1, wherein:
applying a dry powder coating comprises applying a first dry powder coating over the liquid primer and applying a second dry powder coating over the first dry powder coating; and
the second dry powder coating forms a layer having a lower abrasion resistance than a layer formed by the first dry powder coating.

10. The article of claim 1, wherein the article comprises a metal substrate.

11. The article of claim 1, wherein:
the article is a component of a device;
the surface of the article with the abradable dry powder coating thereon is one of two mating surfaces of the device.

12. The article of claim 1, wherein the porous layer formed from particles of the dry powder coating adhered to one-another in a layer distal from the surface is at least 0.0003" thick.

13. A method of forming an abradable dry powder coating on an article, comprising:
applying a liquid primer comprising a first thermosetting resin and a solvent to a surface of the article;
applying the dry powder coating over the liquid primer, wherein the dry powder coating comprises particles comprising a second thermosetting resin and filler material;
wherein the filler material does not melt at or below a cure temperature of the second thermosetting resin; and
curing the liquid primer and the dry powder coating to form a dry powder film lubricant, wherein the dry powder film lubricant comprises a polymer matrix formed from the first thermosetting resin in a layer proximate the surface of the article and a porous layer formed from particles of the dry powder coating adhered to one another in a layer distal from the surface;
wherein curing causes the dry powder particles to sinter, but curing completes without the particles of the dry powder coating flow sufficiently to lose their discrete identities; and
wherein the porous layer formed from the particles of the dry powder coating adhere to one another in a layer distal from the surface of the article is thicker than the polymer matrix formed from the first thermosetting resin in a layer proximate to the surface of the article.

14. The method of claim 13, further comprising forming the dry powder of the dry powder coating by a method comprising:
melt-mixing the second thermosetting resin and the filler material to form a composite;
cooling the composite; and
breaking up the cooled composite to form the dry powder.

15. The method of claim 13, wherein applying the dry powder coating comprises applying the dry powder coating electrostatically.

* * * * *